United States Patent [19]
Thelen

[11] 3,829,197
[45] Aug. 13, 1974

[54] ANTIREFLECTIVE MULTILAYER COATING ON A HIGHLY REFRACTIVE SUBSTRATE

[75] Inventor: Alfred Thelen, Am Sannaberg 553, FL-9495 Triesen, Furstentum, Liechtenstein

[73] Assignee: Balzers Patent Und Beteiligungs-Aktiengesellschaft, Balzers, Furstentum, Liechtenstein

[22] Filed: Oct. 18, 1972

[21] Appl. No.: 298,548

[30] Foreign Application Priority Data
Oct. 20, 1971  Switzerland.................... 015454/71

[52] U.S. Cl. ............................................... 350/164
[51] Int. Cl. ............................................. G02b 1/10
[58] Field of Search................... 350/164, 165, 166

[56] References Cited
UNITED STATES PATENTS
| 2,519,722 | 8/1950 | Turner | 350/164 |
| 3,185,020 | 5/1965 | Thelen | 350/164 |
| 3,432,225 | 3/1969 | Rock | 350/164 |
| 3,463,574 | 8/1969 | Bastien | 350/164 |

Primary Examiner—James W. Lawrence
Assistant Examiner—C. E. Church
Attorney, Agent, or Firm—John J. McGlew

[57] ABSTRACT

An antireflective multilayer coating for highly refractive glass material comprises five partial layers adjusted to one another as for their reflective indices and their optical thicknesses so as to obtain a vary favorable antireflection curve with a broad flat middle portion in the order of the desired, so-called reference wavelength. To this effect, the refraction index of the individual layers is provided, for the first and third layer, by 15 percent lower and, for the second and fourth layer, by 10 to 30 percent higher than the refractive index of the substrate and for the outer fifth layer lower than 1.5, and the optical thicknesses are provided, for the first and fifth layer one-fourth, for the second layer one-eightieth to one-sixteenth, for the third layer one-eighth to one-fifth, and for the fourth layer one-half of the reference wavelength. The value of the refractive index of the fifth layer preferably approaches to the square root of the refractive index of the substrate.

2 Claims, 5 Drawing Figures

ANTIREFLECTIVE MULTILAYER COATING ON A HIGHLY REFRACTIVE SUBSTRATE

BACKGROUND OF THE INVENTION

1. Field of the Invention

This invention relates, in general, to antifriction coatings of reflective materials and, in particular, to a new and useful multilayer antireflection coating deposited on a substrate having a high index of refraction and built-up of several partial light-transmissive layers whose refractive indices and optical thicknesses are adjusted to one another so as to obtain a desired reduction of reflection over a broad spectral region.

2. Description of the Prior Art

Single- and multilayer antireflection coatings are known in numerous and various forms. The reduction of reflection obtainable by the commonly used single-layer coating with magnesium fluoride proved unsatisfactory for glasses having a higher index of refraction (1.65 to 2.0) as compared to glasses with a lower index of refraction (1.50 to 1.65), because in the first mentioned case, the known Strong's relation (J. Strong, Journ. Opt. Soc. Am. 26, 73 (1936)) $n_{layer} = (n_{substrate})^{1/2}$ can be better satisfied.

However, with the utilization of multilayer coatings for reducing the reflectance of optical surfaces, the problem has turned upside down because in such a case, a substantially more intense reudction of the reflectance can be obtained with such substrates which have a lower refractive index than with substances having a high index of refraction. In particular, layers appropriately adjusted to low index glasses cannot be used without difficulties for substrates having a high refractive index.

FIG. 1 shows reflectance variations of substrates coated with a single layer of magnesium fluoride, the one substrate having a low index of refraction ($n_u = 1.52$) and the other a high index of refraction ($n_u = 1.80$). The third curve shows the reflectance of a substrate having a low index of refraction ($n_u = 1.52$) but coated with a multiple layer of known structure (U.S. Pat. No. 3,432,225). In the diagram, the absciss indicates the wave-lengths in $nm$ (nanometers or millimicrons) and the ordinate the reflectance in percents of the incident light.

In the following description, the conventional professional shorthand is used to describe the structure of multilayer coatings. In this shorthand, the first number signifies the refractive index of the substrate which the layer system is deposited upon. Thus, for example, 1.52 signifies a glass having a refractive index of 1.52. The subsequent numbers indicate the refractive indices of the individual layers and in addition, aside from the index or refraction, in each case there is indicated the optical thickness of the layer in fragments of a reference wavelength. The last number signifies the refractive index of the medium adjacent to the layer system that is, in normal cases, of air having the refractive index 1.0.

The first example we will specify is a known antireflection multilayer coating deposited on a highly refractive substrate (Swiss Pat. No. 223,344); 1.69/ 1.514, $\lambda/4$ / 1.46, $\lambda/4$ / 2,076, $\lambda/4$ / 2.405, $\lambda/4$ / 1.45, $\lambda/4$ / 1.0. This signifies that the consecutive layers deposited on a substrate (glass) with a refractive index of 1.69 are a first layer having a refractive index of 1.514, a second layer having a refractive index of 1.46, a third layer having a refractive index of 2.076, a fourth layer having a refractive index of 2.405 and finally a fifth layer having a refractive index of 1.45, all of the specified layers having an optical thickness of one-quarter of the reference wavelength. This system of the present example adjoins air having a refraction index of 1.0. The resulting antireflection curve for a reference wavelength of 550 $nm$ is plotted in FIG. 2 as the curve 1.

An optical thickness of a layer is the product of the real (geometrical) thickness and the refractive index of the respective layer. By reference wavelength there is understood the mean wavelength of the spectral region in which the antireflection layer is to be effective. For the visible light, it is usual to choose the wavelength of 550 $nm$ as reference, although there may be taken a shorter or longer wavelength for this purpose, according to the case of application.

Other known antireflection multilayer coatings have, for example, the following structure:

1.72 | 1.91, $3\lambda/4$ | 2.53, $\lambda/2$ | 1.46$\lambda/4$ | 1.0
(curve 3 in FIG. 2)

1.72 | 2.06, $\lambda/2$ | 1.38, $\lambda/4$ | 1.0
(curve 2 in FIG. 2)

(A. F. Turner, Le journal de physique et le radium, 11, 444 (1950)). All of these known systems, however, do not meet with the quality attained with low index glasses (FIG. 1).

SUMMARY OF THE INVENTION

In accordance with the invention there is provided a considerably more efficient antireflection multilayer coating for reflective substrates, particularly glasses, having a high refractive index of more than 1.60, comprising five partial layers adjusted to one another so that in the assembly, the refractive index is provided for the first and the third layer by 15 percent lower and for the second and fourth layer by 10 to 30 percent higher than the refractive index of the substrate, and for the fifth or top layer lower than 1.5, and that the provided optical thickness is for the first and the fifth layer one-quarter, for the second layer one-eightieth to one-sixteenth, for the third layer one-eighth to one-fifth, and for the fourth layer one half of the reference wavelength.

In the above mentioned shorthand manner, this combination is indicated by the following scheme:

$$n_{substrate} \left| \begin{array}{c} n_1 < n_u (\text{to } 15\%) \\ nd \approx \lambda/4 \end{array} \right| \left| \begin{array}{c} n_2 > n_u (10 - 30\%) \\ \lambda/80 \leq nd \leq \lambda/16 \end{array} \right|$$

$$n_3 = n_1$$
$$\lambda/8 \leq nd \leq \lambda/5$$

$$n_4 = n_2$$
$$nd \approx \lambda/2$$

$$\left| \begin{array}{c} n_5 < 1.50 \\ nd \approx \lambda/4 \end{array} \right|$$

1.0 where $n_1$, $n_2$ — are the refraction indices of the individual layers, $n_u$ the refraction index of the substrate, the reference wavelength in the vicinity of which the antireflection effect is to be obtained, and nc is the optical thickness.

It has been proved that a multilayer coating composed of individual layers of the indicated sequence and properties can be deposited on substrates having a high index of refraction with the effect of obtaining an antireflection characteristic much more favorable than with single-layer coatings deposited on highly refractive substrates and in no way second to the characteristic obtained with multilayer coatings on substrates having low refractive indices. It also has proved that, preferably, the value of the refractive index of the outer layer should approach to the square root of the refractive index of the substrate.

Accordingly, it is an object of the invention to provide a highly efficient antireflection multilayer coating composed of several, preferably five individual layers of appropriate refractive indices and optical thicknesses which can be deposited on substrates having high indices of refraction.

Another object of the invention is to provide a mutual adjustment of the refractive indices of the individual layers in accordance with the value limits proved as optimal.

Still another object of the invention is to provide a mutual adjustment of the optical thicknesses of the individual layers in accordance with the value limits proved as optimal and in relation to a reference wavelength given by the mean wavelength of the spectral region in which the antireflective effect is desired.

According to a further feature of the invention the value of the refractive index of the outer or fifth individual layer preferably approaches to the square root of the refractive index of the substrate.

For an understanding of the principles of the invention, reference is made to the following description of a typical embodiment thereof as illustrated in the accompanying drawing.

GENERAL DESCRIPTION OF THE PREFERRED EMBODIMENT

Figure 1:
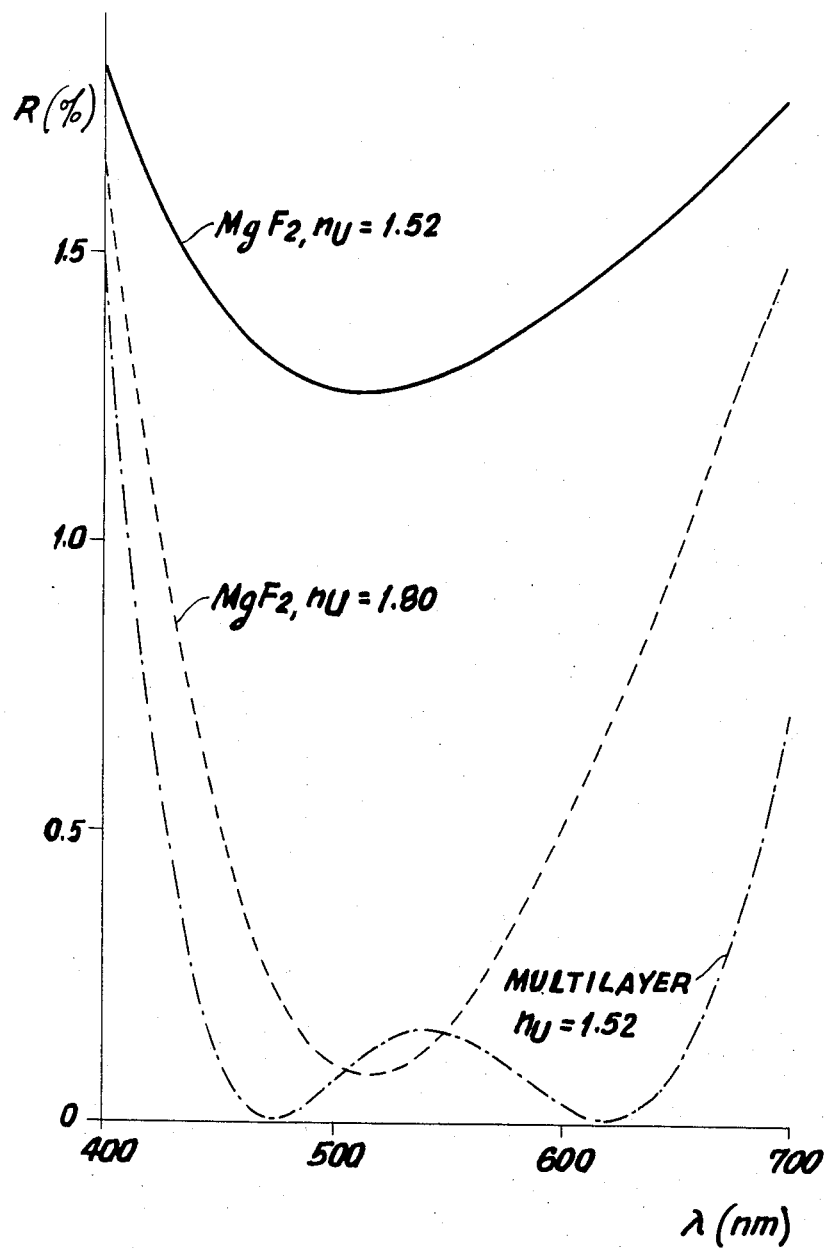
FIG. 1 is a diagram showing antireflection curves of one known single-layer and one known multilayer coating deposited on substrates having low refractive indices and of one known singlelayer coating deposited on a substrate having a high refractive index.
Figure 2:
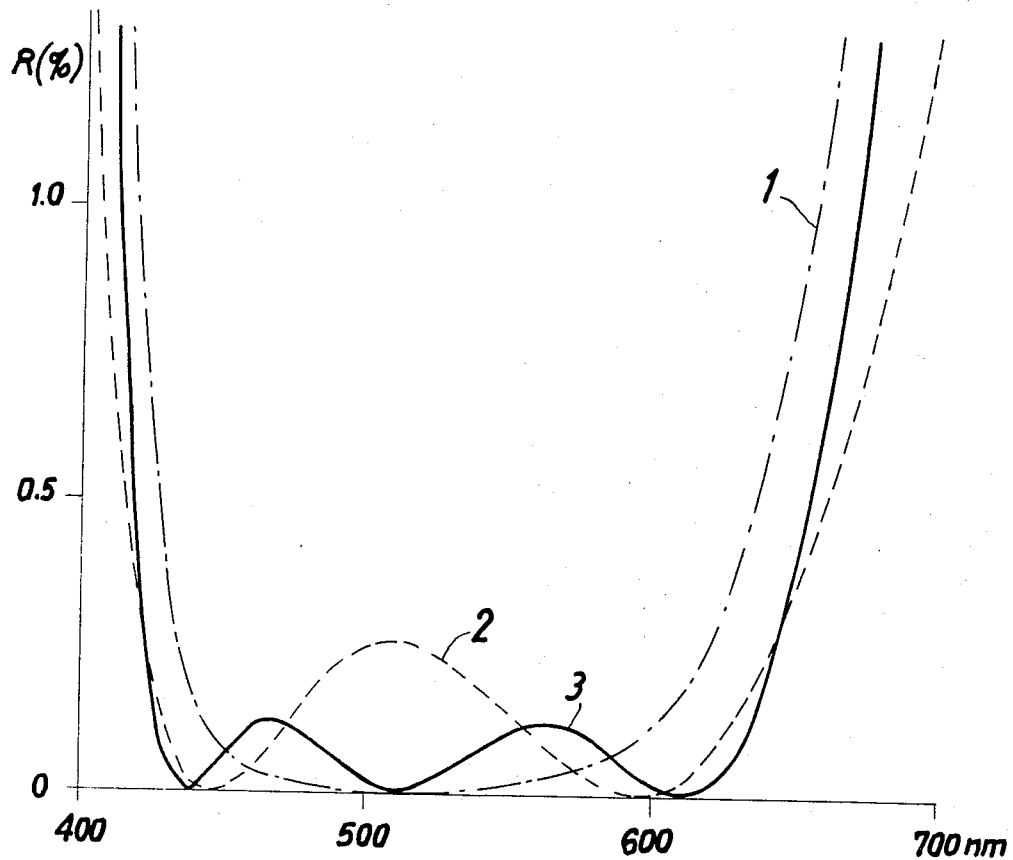
FIG. 2 is a diagram showing antireflection curves of three known multilayer coatings deposited on substrates having high refractive devices.

Referring to the drawings in particular, the FIGS. 1 and 2 relative to the prior art, have already been mentioned above.

Figure 3:
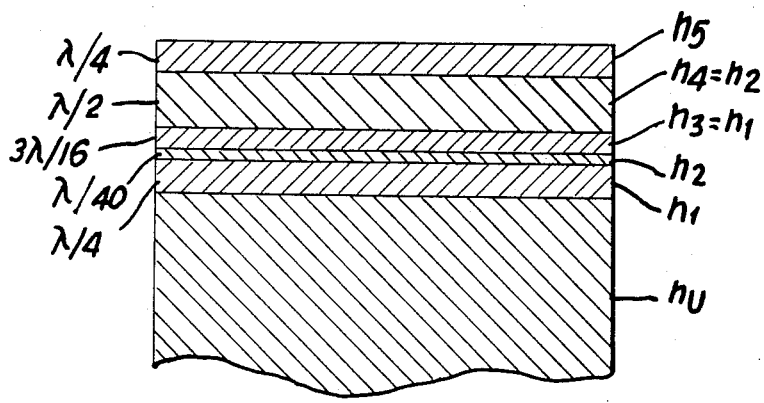
FIG. 3 shows a schematic cross-section of a multilayer coating according to the invention, deposited on a substrate having a high refractive index, the partial layers being represented in optical thicknesses.

FIG. 3 shows, in schematical representation, a cross-section of an inventive multilayer coating wherein the refractive indices and the optical thicknesses of the partial layers comply with the values provided by the invention.

Figure 4:
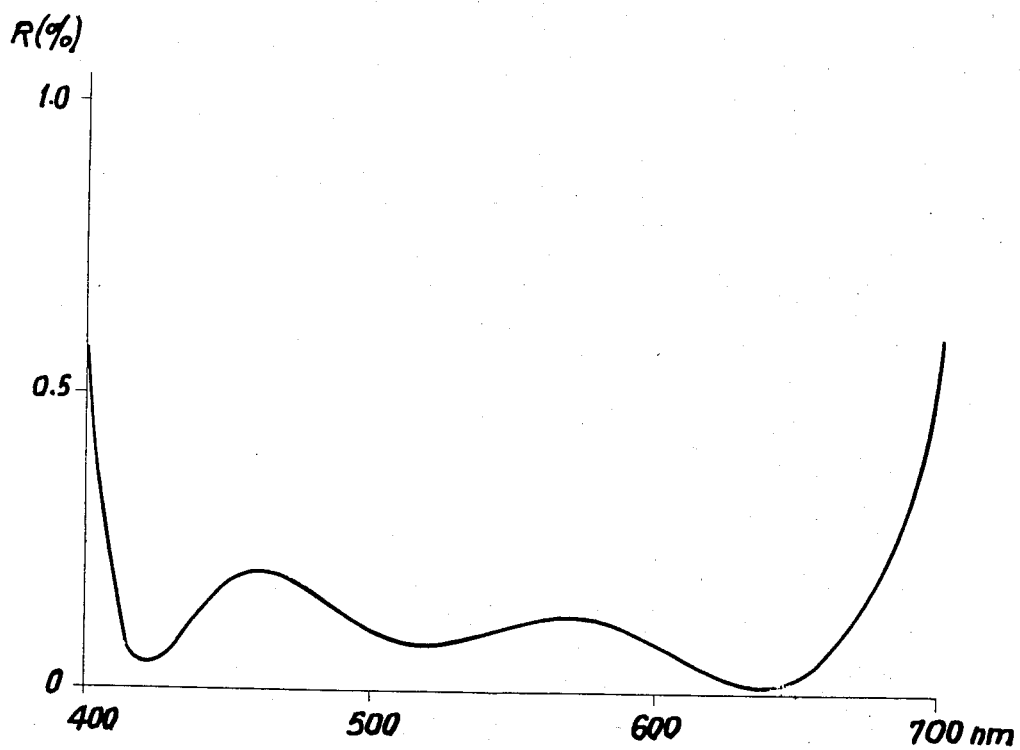
FIG. 4 is a diagram showing the antireflection curve of an inventive multilayer coating deposited on a substrate having a high refractive index of 1.75.

Supposed, for example, the values being $n_u = 1.75$, $n_1 = 1.62$, $n_2 = 2.06$, $n_5 - 1.38$ and $\lambda = 515$ nm, the result obtained is the antireflection curve represented in FIG. 4. This characteristic, in spite of the fact that the used substrate has a high refractive index, is in no way inferior to the characteristic shown in FIG. 1 for the multilayer coating and is decidedly superior to the characteristics represented in FIG. 2.

Figure 5:
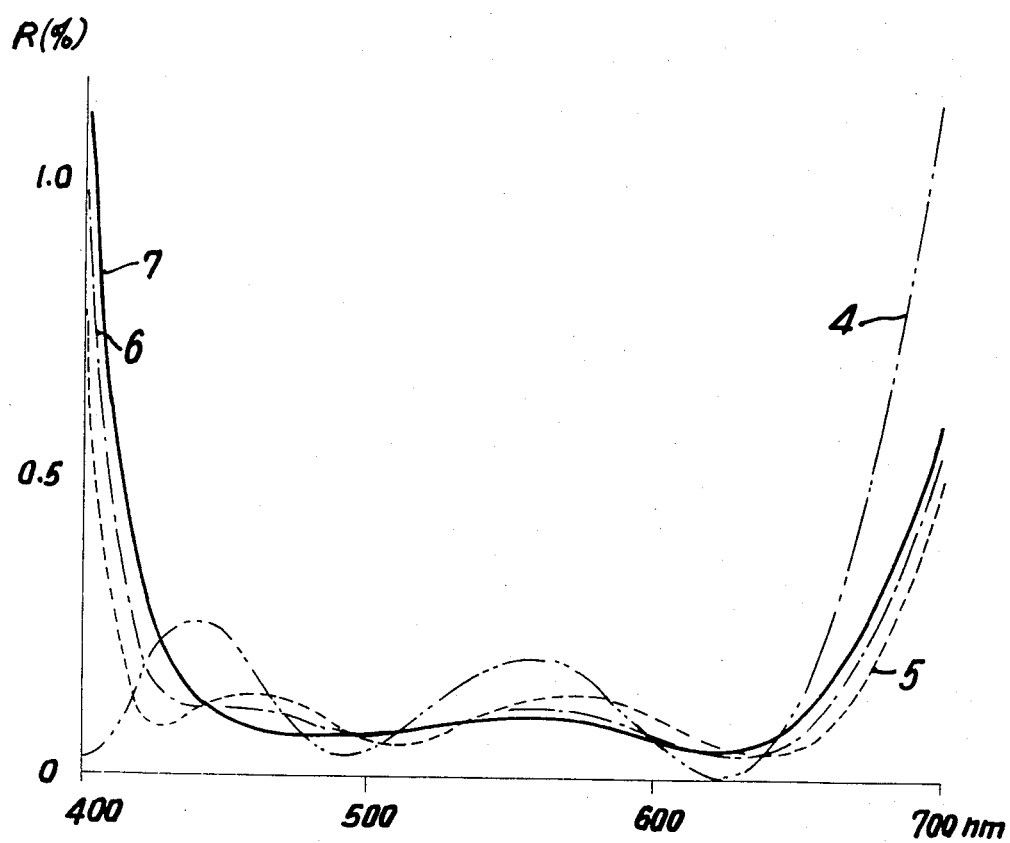
FIG. 5 is a diagram showing for different reference wavelengths antireflection curves of other multilayer coatings deposited, according to the invention, on a substrate having a high refractive index.

In the diagram of FIG. 5, further examples of multilayer coatings composed in accordance with the invention are represented by their antireflection curves corresponding to different wavelengths and different refractive indices of the substrate. The following table indicates the respective values which the curves are based upon:

1.80 | 1.63, $\lambda/4$ | 2.05, $\lambda/72$ | 1.03, $\lambda/5$ |
| 2.05, $\lambda/2$ | 1.38, $\lambda/4$ | 1.0
$\lambda = 490$ nm, curve 4 in FIG. 5

1.71 | 1.63, $\lambda/4$ | 2.05, $\lambda/35$ | 1.63, $3\lambda/19$ |
| 2.05, $\lambda/2$ | 1.38, $\lambda/4$ | 1.0
$\lambda = 511$ nm, curve 5 in FIG. 5

1.68 | 1.63, $\lambda/4$ | 2.05, $\lambda/30$ | 1.63, $\lambda/7$ |
| 2.05, $\lambda/2$ | 1.38, $\lambda/4$ | 1.0
$\lambda = 513$ nm, curve 6 in FIG. 5

1.65 | 1.63, $\lambda/4$ | 2.05, $\lambda/29$ | 1.63, $\lambda/8$ |
| 2.05, $\lambda/2$ | 1.38, $\lambda/4$ | 1.0
$\lambda = 514$ nm, curve 7 in FIG. 5

In all of these systems, the total reflectance value obtained for the region of the visible light is less than the respective value of any of the coating systems known hereinbefore. Also, they show a larger region of reflection with low maxima. Starting from a refractive index of $n_u = 1.68$, a third maximum begins to form.

The limits indicated for the refractive indices must be observed in order to obtain a satisfying result. The optimal values for the optical thicknesses of the partial layers may in each case most rapidly be found, for instance so that, starting from a solution comprised within the scope of the patent claim, variations of this solution are calculated with the aid of a computer and the optimal solution is approximated. The best among several variants may easily be found even by way of experimentation. The optimal optical thickness of the layers depends on the individual case of application (for example on the bandwidth, the slope of the antireflection curve sides, the selectivity) but above all on the refractive index of the substrate. The layer thicknesses thus determined are to be realized with a tolerance of $\pm 20$ percent. However, a greater accuracy of $\pm 10$ percent is recommendable for the two first partial layers.

Available materials for the partial layers having appropriate refractive indices are the known evaporation and cathode sputtering substances. Magnesium fluoride, cryolite and silicon dioxide ($SiO_2$) are the well known substances having a low refractive index, and titanium dioxide ($TiO_2$), zirconium dioxide ($ZiO_2$) and the like have proved as high refractive layers. In using mixed layers, refractive indices of intermediate values may be obtained.

As for the fifth layer, i.e., the top layer, it should yet be noted that it is advantageous to choose for the same a refractive index approaching as much as possible to the square root of the substrate index, as is well known for the single-layer coatings. Nevertheless, good results may also be obtained with refractive indices complying with this requirement only approximately. In any case, however, the refractive index must have a value less than 1.5, as mentioned above.

The coating technique necessary to deposit the partial layers in accordance with the invention is known. Suitable techniques are above all the vacuum coating by evaporation or the cathode sputtering but, as it is known, non-absorptive hard layers may also be deposited in a chemical way.

While a specific embodiment of the invention has been shown and described in detail to illustrate the application of the principles of the invention, it will be understood that the invention may be embodied otherwise without departing from such principles.

What is claimed is:

1. An antireflection multilayer coating deposited on a substrate having a refractive index higher than 1.60 and comprising at least five partial layers, namely the first, second, third, fourth and fifth partial layer of which the first partial layer adjoining said substrate has an optical thickness of one-quarter of a reference wavelength and a refractive index up to 15 percent lower than the refractive index of the substrate, the following second partial layer has an optical thickness of one-eightieth to one-sixteenth of the reference wavelength and a refractive index which is by 10 to 30 percent higher than the refractive index of the substrate, the subsequent third partial layer has the same refractive index as the first partial layer but an optical thickness of one-eighth to one-fifth of the reference wavelength, the subsequent fourth partial layer has the same refractive index as the second partial layer but an optical thickness of one half of the reference wavelength, and the final or outer fifth partial layer has an optical thickness of one-quarter of the reference wavelength and a refractive index lower than 1.5, said reference wavelength being the wavelength in the vicinity of which the reduction of the reflectance is to be effected.

2. An antireflection multilayer coating according to claim 1, wherein said fifth partial layer has a refractive index corresponding approximately to the square root of the refractive index of said substrate.

* * * * *